United States Patent Office 3,142,699
Patented July 28, 1964

3,142,699
URETHANE COMPOUNDS AND PROCESS
THEREFOR
Kuno Wagner and Hans Hertlein, Leverkusen, Germany, assignors to Farbenfabriken Bayer Aktiengesellschaft, Leverkusen, Germany, a corporation of Germany
No Drawing. Filed Apr. 15, 1959, Ser. No. 806,460
Claims priority, application Germany Apr. 24, 1958
13 Claims. (Cl. 260—471)

This invention relates to urethane compounds and, more particularly, to urethane compounds free from urea groups.

It is well known that urethanes are formed from the reaction of an isocyanate and a compound containing an hydroxyl group by the well-known reaction:

$$RNCO + R'OH \rightarrow RNHCOOR'$$

wherein R and R' represent organic radicals, such as, phenyl, ethyl and the like. Where difunctional or higher polyfunctional reactants are used, polyurethane plastics result. In the heretofore known preparation of polyurethane plastics, polyalkylene ethers, such as, polyethylene ether glycols of high molecular weight, have been used to prepare polyurethane plastics. It is also known to prepare polyurethane plastics from compounds containing acetal groupings in the chain.

It is an object of this invention to provide urethane compounds free from urea linkages. Another object of this invention is to provide a process for the preparation of urethane compounds free from urea linkages.

The foregoing objects and others, which will become apparent from the following description, are accomplished in accordance with the invention, generally speaking, by providing urethane compounds free from urea linkages which are obtained by reacting an organic isocyanate with a semi-acetal or a semi-mercaptal. Thus, this invention contemplates urethane compounds free from urea linkages and a process for the preparation thereof which involves reacting an organic isocyanate with a semi-acetal or a semi-mercaptal under substantially anhydrous, non-acid conditions at a temperature below about 30° C. The present invention, therefore, is characterized by the fact that organic mono- or polyisocyanates are reacted with compounds containing semi-acetal or semi-mercaptal groups of the formula

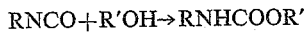

wherein X represents oxygen or sulfur and R is hydrogen, an aliphatic hydrocarbon radical, such as ethyl, a cycloaliphatic hydrocarbon radical, such as cyclopentenyl, an aromatic hydrocarbon radical, such as phenyl, or a heterocyclic radical, such as pyridyl, and n represents an integer of one or more, said groups being bonded to those radicals of monohydric or polyhydric alcohols or mercaptals which are free from OH or SH groups.

The formation of urethanes or polyurethanes from semiacetals or semi-mercaptals and isocyanates is an unexpected development in urethane chemistry. Semi-acetals are generally unstable and, in fact, seldom exist except in equilibrium with the alcohol and aldehyde from which they were formed. It was expected that the isocyanate would react with the alcohol causing the equilibrium in the reaction:

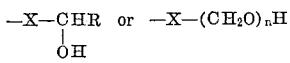

to be progressively displaced toward the right, leading to the formation of the aldehyde and the heretofore known urethanes by reaction of the isocyanate with the alcohol. Contrary to the expected reaction, it has been found that, if the temperature of the reaction mixture is held below about 30° C. and the reaction carried out under substantially anhydrous, non-acid conditions, novel urethane compounds free from urea groups are obtained by reaction of the isocyanate with the semi-acetal or semi-mercaptal, depending on the starting materials. While it is possible to employ any suitable semi-acetal or semi-mercaptal in the process of this invention, it is preferred to employ semi-acetals and/or semi-mercaptals having a molecular weight below about 700 and preferably within the range of about 60 to about 700. Suitable semi-acetals or semi-mercaptals are obtained by well-known processes involving the reaction of an alcohol and/or a mercaptan with an aldehyde. Any suitable alcohol, mercaptan or aldehyde may be used. Suitable alcohols include, for example, aliphatic alcohols, such as, for example, methanol, ethanol, butanol, decanol, isopropyl alcohol, and the like; alkylene glycols, such as, for example, ethylene glycol, 1,2-propylene glycol, 1,4-butane diol, 1,6-hexane diol, and the like; polyalkylene ether glycols, such as, for example, diethylene glycol, as well as higher polyalkylene glycols, such as are obtained, for example, by the condensation of alkylene oxides, such as, for example, ethylene oxide, 1,3-propylene oxide, 1,2-propylene oxide, 1,4-butylene oxide and the like with a small amount of an hydroxyl compound to initiate the polymerization, such as, water or ethylene glycol, for example; thioether glycols, such as, for example, thiodiglycol and the like; amino alcohols, such as, for example, N-methyl diethanol-amine, N,N-diethylamino ethanol, dimethylethanolamine and the like, trihydric alcohols, such as, for example, glycerine, trimethylol propane and the like; higher polyhydric alcohols, such as, for example, pentaerythritol and hexadecanol; alcohols containing urethane groups, such as, for example, the reaction product of an excess of one of the aforementioned alcohols with an isocyanate, such as, for example, the reaction product of two mols of ethylene glycol with one mol of 2,4-toluylene diisocyanate and the like; alcohols containing melamine groups and/or N-methylol groups, such as, for example, hexamethylol melamine; cyclic acetals, such as, for example, mono-formal pentaerythritol and the like; phenols, such as, for example, phenol, naphthol and the like, phenol alcohols, such as, for example, the mono-beta-hydroxy ethyl ether of hydroquinol and the like; dihydroxy ethyl anilines, such as, for example, N,N-dihydroxyethyl aniline and the like, dihydroxyethyl xylidene, such as, for example, 2,4-dihydroxy ethyl xylidene and the like; hydroxyethylated xylidene, such as, for example, 2,6-hydroxyethyl xylenol and the like; alpha, gamma hydroxyethylated resorcin or the like; hydroxy polyesters, such as, for example, the reaction product of ethylene glycol or other suitable alcohol with adipic acid, succinic acid, phthalic acid or their anhydrides, such as, for example, phthalic anhydrides, polythioethers, such as, for example, the condensation product of thiodiglycol with ethylene oxide and polycarbonates such as, for example, the compound having the formula

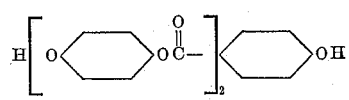

Suitable mercaptans include, for example, methyl mercaptan, ethyl mercaptan, isobutyl mercaptan, n-amyl mercaptan, dodecyl mercaptan, phenyl mercaptan and the like. Compounds containing both hydroxyl and sulphhydryl groups may be used, such as, for example, 1-hydroxy amylene mercaptan. Suitable aldehydes include formaldehyde, acetaldehyde, propionaldehyde, isobutylaldehyde, benzaldehyde and furfural.

Particularly suitable for the process of the present invention are semi-acetals of formaldehyde, which is particularly distinguished from other aldehydes by the fact that it readily initiates further additions to the semi-acetals formed to provide polymethylene glycol ether acetals, for example, $CH_3OCH_2O(CH_2O)_nH$ or $$HOCH_2O(CH_2O)_nH$$

the molecular weight of which can be influenced by varying the quantity of formaldehyde, the catalyst and the temperature. Those members of high molecular weight in this series are available by means of known polymerization processes using anhydrous formaldehyde (see for example H. Staudinger, "Die Hochmolekularen organischen Verbindungen" (1932), pages 226 and 255).

The semi-acetals are formed by simply mixing the aldehydes with the alcohols or mercaptans. Since with semi-acetals of formaldehyde, the equilibrium at temperatures below 20° C. is substantially on the side of the semi-acetals, it is generally sufficient if 1 mol of formaldehyde is used per hydroxyl group or sulphhydryl group for forming the semi-acetal at these temperatures. Semi-acetals of acetaldehyde, propionaldehyde etc. are formed with greater difficulty and with much less heat of reaction due to the decreasing reactivity of the aldehydes. However, even here, it is possible to keep the equilibrium substantially on the semi-acetal side by working at low temperatures and introducing excess aldehyde, which can be removed, for example by distillation, after completing the reaction of the semi-acetals with the isocyanates.

With alcohols or mercaptans which react slowly and even with formaldehyde as semi-acetal component, the equilibrium can clearly be on the side of the free alcohols, even at temperatures below 10° C. In these cases, for example, with tertiary alcohols and long-chain aliphatic alcohols or mercaptans, more than 1 mol and even more preferably up to 2 mols of formaldehyde will be used for displacing the equilibrium to the semi-acetal side.

Formaldehyde is preferably introduced in anhydrous gaseous form into the alcohol or mercaptan, provision being made for good cooling. Gaseous formaldehyde can for example be obtained by thermal decomposition of paraformaldehyde or of alpha-, beta- or gamma- polyhydroxy methylene. Usually, however, the splitting of paraformaldehyde will be effected in the alcohol or mercaptan itself, by adding traces of alkalis to the hot suspension. Depending on the quantity of formaldehyde introduced, semi-acetals of the formulae $ROCH_2OH$ or $$RO(CH_2O)_nH$$

wherein R is as defined above and $n$ is an integer greater than 1, are formed. By adding tertiary bases in the cold, it is even possible to raise the molecular weight to such a degree that completely insoluble products are formed. By polymerization of gaseous anhydrous formaldehyde using known processes, for example in the presence of polyhydroxy compounds as chain-breakers, products of particularly high molecular weight are obtained.

Any suitable isocyanate may be used. The following monoisocyanates and polyisocyanates are examples of suitable organic isocyanates for carrying out the process of the present invention: ethyl isocyanate, hexamethylene diisocyanate, cyclohexyl isocyanate, 1,4-cyclohexylene diisocyanate, dicyclohexyl 1,4-diisocyanate, phenyl isocyanate, p-methoxyphenyl isocyanate, toluyl isocyanate, 1-methyl benzene-2,4-diisocyante, 1-methyl-benzene-2,6-diisocyanate, 1,4-phenylene diisocyanate and 1,3-phenylene diisocyanate, p,p',p" isocyanato triphenyl methane and the like.

Advantageously, the semi-acetals or semi-mercaptals are reacted with the monoisocyanates or polyisocyanates in the absence of solvents at temperatures below 30° C. At temperatures higher than 30° C., secondary reactions can occur, these being caused by the reaction of the isocyanates with the free alcohols present in the equilibrium. Solvents, especially polar solvents with high dielectric constants readily lead to undesired displacements of equilibrium in the direction of the free alcohol. Therefore, if it is desired to use solvents, it is advisable to choose those having a low dielectric constant, for example benzene, toluene or acetoacetic acid ester. With more sluggishly reacting isocyanates or semi-acetals, such as those containing the aldehyde radical combined with long-chain mercaptans or with tertiary alcohols, it is desirable to accelerate the addition reaction by adding catalysts. Organic tertiary bases, such as, for example, triethylene diamine and the like are recommended for this purpose.

Particular care should be paid to the chlorine-containing aldehydes, for example chloroacetaldehyde, to see that these are free from minute quantities of acid. With formaldehyde semi-acetals, it is generally not necessary to activate the reaction with the diisocyanates, since some sodium formate is formed by the alkali used for depolymerization, especially when the semi-acetals are prepared from paraformaldehyde, and this formate has a sufficient accelerating effect on the reaction with the isocyanates.

With sparingly soluble, insoluble or thermally stable semi-acetals, for example with the polyhydroxy methylene glycols, the reaction with the isocyanates can also take place at elevated temperature. In this case, however, a thermal depolymerization of the polyhydroxy methylene glycols is also observed as a secondary reaction. Because of different solubility and different hydrolytic stability, however, these secondary products can be separated easily from the desired addition products. It has already been pointed out that it is frequently advantageous to effect the formation of the semi-acetal in the presence of an excess of aldehyde. The aldehyde excess must of course only be removed after the reaction with the isocyanates has taken place. This can be effected by distillation or, in the case of formaldehyde, better still by subsequent treatment of the reaction product with ammonia.

The resulting reaction products are crystalline, waxy or even liquid compounds and can be purified by crystallization or reprecipitation. They cannot be distilled, even under high vacuum, and are decomposed at temperatures of from 140 to 200° C., splitting up inter alia into formaldehyde, carbon dioxide and volatile alcohols. They have for the major part good solubility in organic solvents such as, for example, benzene, toluene, acetone, dioxane, tetrahydrofuran and the like. At temperatures in the region of 120 to 180° C., they give off combined formaldehyde in a highly reactive form. Others act as substances splitting off isocyanate, in that they react like a free isocyanate and simultaneously liberate formaldehyde. Others decompose with decarboxylation and liberation of formaldehyde, Schiff's bases and condensation products of aromatic diamines with aldehydes being formed. The new addition products differ from the isomeric N-methylol compounds by the behavior which has been set forth, by better solubility in organic solvents, improved stability at temperatures below 100° C. and also improved stability in the dissolved state.

The new addition products are useful in the manufacture and modification of plastics. They can be used for instance as formaldehyde generators and hidden isocyanates for vulcanizing and cross-linking storage-stable polyurethane intermediates. Thus, for instance, the reaction product of a hydroxyl polyester, polyether or polythioether with a polyisocyanate and a chain lengthening agent which reaction product is storage-stable can be processed by incorporating the new addition products on a roll to give the final cross-linked elastomers. The new addition products are compatible with these storage-stable intermediates and can easily be processed therewith. The new addition products are valuable polymerization catalysts for polymerizing mono- and polyisocyanates which trimerize to give isocyanurates. Another application for the new addition products is to use them as cross-linking agents for vinyl polymers containing amide groups, thus, for instance, for the vulcanization of copolymers of methacrylamide with other vinyl compounds such as methacrylic esters. These cross-linked vinyl polymers serve as coatings on textiles especially to fix pigments on textiles.

In order to better describe and further classify the invention, the following are specific embodiments:

*Example 1*

About 32.1 parts by weight of dry powdered paraformaldehyde are suspended in about 32 parts by weight of boiling anhydrous methanol. About 0.1 part by volume of a 2N NaOH solution is added to the mixture while stirring well. After a few minutes, the cleavage of the paraformaldehyde is complete. The clear solution of the resulting semi-acetals is cooled to about 0° C., and after about 30 minutes the temperature is permitted to rise to about 15° C. While stirring this solution, a solution of about 153.5 parts by weight of p-chlorophenyl isocyanate in about 60 parts by volume of benzene is added dropwise over a period of about 4 hours, the reaction temperature not being allowed to rise above about 25° C. The solution is kept for about another 14 hours at room temperature, about 100 parts by volume of benzene are stirred in, and the solution is filtered off from about 4 to 5 parts by weight of N,N'-di-p-chlorophenyl urea. The solution is concentrated in vacuo and the pasty solidified mass is taken up in acetone, freed from extremely small quantities of insoluble by-products, again concentrated by evaporation in vacuo, and dried at room temperature over calcium chloride. About 200 parts by weight (91.4% of the theoretical) of the crystallized compound of the formula $$CH_3OCH_2OCONHC_6H_4Cl$$

(M.P. 50° C. to 52° C.) are obtained.

Analysis for $C_9H_{10}ClO_3N$: Calculated C, 50.12%; H, 4.64%; Cl, 16.47%; O, 22.27%; N, 6.49%. Found C, 50.18%; H, 4.51%; Cl, 16.25%; O, 22.53%; N 6.52%.

*Example 2*

About 64.2 parts by weight of paraformaldehyde are suspended in about 118 parts by weight of boiling anhydrous isopropyl alcohol and depolymerized as in Example 1, with about 0.2 part by volume of a 2 N NaOH solution. A solution of about 306.6 parts by weight of p-chlorophenyl isocyanate in about 80 parts by volume of benzene is introduced dropwise into the resulting semi-acetal at about 15° C. within a period of about 3 hours and while stirring well. The mixture is thereafter kept for about another 12 hours at room temperature, and it is then worked up and purified as in Example 1. About 430 parts by weight (89% of the theoretical) of crystallized compound having the formula $C_3H_7OCH_2OCONHC_6H_4Cl$ (M.P. 47° C. to 49° C.) are obtained.

Analysis for $C_{11}H_{14}ClO_3N$: Calculated C, 54.12%; H, 5.79%; Cl, 14.55%; O, 19.69%; N 5.75%. Found C, 54.54%; H, 5.87%; Cl, 14.39; O, 19.47%; N 5.92%.

*Example 3*

The liquid semi-acetals are prepared as described in Examples 1 and 2 from:

(a) about 1 mol of methanol and about 1 mol of formaldehyde,
(b) about 1 mol of ethylene glycol and about 2 mols of formaldehyde,
(c) about 1 mol of glycerine and about 3 mols of formaldehyde,
(d) about 1 mol of thiodiglycol and about 2 mols of formaldehyde,
(e) about 1 mol of 2,2-dimethyl-1,3-n-propylene glycol and about 2 mols of formaldehyde,
(f) about 1 mol of cyclohexanol and about 1 mol of formaldehyde,
(g) about 1 mol of 1,4-butanediol and about 2 mols of formaldehyde,
(h) about 1 mol of 1,4-butanediol and about 2 mols of formaldehyde, and the quantity of phenyl isocyanate (about 119 or about 238 or about 357 parts by weight) required for the reaction with the actual semi-acetal groups is introduced dropwise at about 10° C. to about 15° C. over a period of about 3 to about 6 hours while stirring well. The viscous reaction products are diluted, if necessary before completing the addition of the phenyl isocyanate, with about 50 to about 100 parts by volume of benzene. The substance is purified from small quantities of by-products as in Examples 1 and 2, and is taken up in acetone and evaporated from the solvent in vacuo at temperatures below about 50° C. The corresponding mono-, di-, or tri-urethanes are obtained with excellent yields in the form of oils showing little tendency to crystallization or as wax-like products, which can be freed from traces of formaldehyde, for example, by dissolving in benzene and treating the benzene solution with a little gaseous ammonia and removing the hexamethylene tetramine which is formed. The resulting methylene glycol ether urethanes are only capable of being distilled with extensive decomposition, even under high vacuum.

If the semi-acetals prepared according to (a) and (h) above are prepared with more than the indicated quantity of formaldehyde, there is likewise obtained substantial bonding of the formaldehyde in the manner of a low molecular weight polyhydroxy methylene glycol ether semi-acetal and (by reaction with phenyl isocyanate) formation of the corresponding urethane mixture.

*Example 4*

About 30 parts by weight of paraformaldehyde are suspended in about 166 parts by weight of phenyl isocyanate while stirring well and kept for about 2 hours at about 140° C. and thereafter for about 30 minutes at about 160° C. There is partial depolymerization of the paraformaldehyde and substantial dissolving of the polyhydroxy methylene glycol semi-acetal after reaction with phenyl isocyanate. After cooling with iced water, the contents of the flask solidify by combining with the solvent to form a jelly-like mass. It is stirred with petroleum ether, freed from excess phenyl isocyanate, and the finely powdered colorless substance is dissolved in benzene and again precipitated with petroleum ether. Traces of unreacted paraformaldehyde are eliminated by boiling with powdered substance in boiling methanol and adding traces of alkali. The odorless and colorless substance which is obtained melts with decomposition at about 170° C. to about 175° C.

Analysis for $C_6H_5NHCOO(CH_2O)_{44}CH_2OCONHC_6H_5$: Calculated C, 44.12%; H, 6.35%; O, 47.82%; N 1.74%. Molecular Weight: 1609. Found C, 44.40%; H, 6.61%; O, 47.49%; N 1.79%. Molecular Weight: 1569. Yield: 15 parts by weight (50% of the theoretical).

*Example 5*

The procedure set out in Example 1 is followed, and a semi-acetal is prepared from about 64.2 parts by weight of paraformaldehyde and about 64 parts by weight of methanol, but instead of p-chlorophenyl isocyanate, about 174 parts by weight of a mixture of 70% 1-methylbenzene-2,4-diisocyanate and 30% 1-methylbenzene-2,6-diisocyanate has been added to the reaction mixture to lower the viscosity, and the reaction is completed as described in Example 1. There is obtained a substantially quantitative yield of a diurethane of resinous consistency having an excellent solubility in acetone, benzene, and toluene. The said diurethane breaks down under thermal decomposition at about 120° C. to about 140° C., partly into the methyl urethanes of the diisocyanate employed splitting off formaldehyde, and partly into tolylene diamine-formaldehyde condensation products splitting off methanol and CO₂.

*Example 6*

The procedure set forth in Example 1 is followed, and a semi-acetal is prepared from about 117 parts by weight of N,N-diethyl aminoethanol and about 32 parts by weight of paraformaldehyde. This is diluted with about 180 parts by volume of benzene and about 87 parts by weight of 1-methylbenzene- 2,4-diisocyanate are added dropwise at about 7° C. to about 8° C. while stirring well. After completing the reaction, the viscous solution is diluted with acetone, small amounts of formaldehyde are destroyed with gaseous ammonia, and finally the substance is freed by filtration from small quantities of sparingly soluble by-products. After driving off the solvent in vacuo, a 90% yield is obtained of a compound having the formula

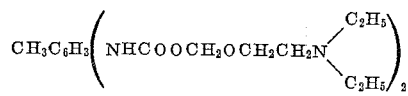

as an odorless resinous mass.

*Example 7*

As in Example 1, a semi-acetal is prepared from about 31 parts by weight of ethylene glycol and about 32 parts by weight of paraformaldehyde, and the liquid semi-acetal is introduced dropwise at about 20° C. while stirring rapidly into about 522 parts by weight of a mixture of 70% 1-methylbenzene-2,4-diisocyanate and 30% 1-methylbenzene-2,6-diisocyanate. There is obtained a solution in excess tolylene diisocyanate of a compound having the formula $$C_2H_4(OCH_2OCONHC_6H_3(CH_3)NCO)_2$$

The NCO content of the solution is about 37.38%. The storability of the solution is improved by stabilizing with benzoyl chloride.

*Example 8*

As in Example 1, a semi-acetal is prepared from about 20.2 parts by weight of N-dodecyl mercaptan and twice the calculated quantity (6.5 parts by weight) of paraformaldehyde. The addition product which is obtained is waxy at about 10° C. About 11.9 parts by weight of phenyl isocyanate are added all at once to the molten semi-mercaptan, the mixture is quickly cooled with a mixture of ice and common salt, and at the same time about 0.2 part by volume of dimethyl benzylamine is added to activate the reaction. The reaction mixture is constantly cooled, and the internal temperature is not permitted to exceed about 12° C. After about 6 hours, about 100 cc. of water are added, the reaction product is extracted with ether, and traces of uncombined formaldehyde are removed with ammonia. After drying the ethereal solution over sodium sulphate and evaporating the ether, a waxy addition product is obtained which has excellent solubility in organic solvents. (M.P. 28° C. to 31° C.)

*Example 9*

As in Example 1, a semi-acetal is prepared from about 64 parts by weight of methanol and about 64.2 parts by weight of paraformaldehyde, and about 0.5 cc. of dimethyl benzylamine is added to activate the reaction. About 168 parts by weight of hexamethylene diisocyanate are added dropwise while stirring well over a period of about 4 hours. After standing for about 15 hours, the smell of free hexamethylene diisocyanate has disappeared. The substance is thoroughly stirred with about 400 parts by volume of benzene, it is filtered off from a small quantity of sparingly soluble by-products, and the benzene is driven off in vacuo. There are obtained about 233 parts by weight (81% of the theoretical) of a formaldehyde-free compound of the formula $$CH_3OCH_2OCONH(CH_2)_6NHCOOCH_2OCH_3$$

which by comparison with the isomeric N,N′-dimethylol hexamethylene dimethyl urethane has excellent solubility in organic solvents. By its thermal or hydrolytic decomposition, in contrast to the isomeric methylol compound, it changes into polymeric Schiff's bases of hexamethylene diamine and formaldehyde splitting off CO₂ and methanol.

*Example 10*

About 60 parts by weight of gaseous formaldehyde are introduced into about 400 parts by weight of the 2,2′-dimethyl-1,3-propylene glycol ether of pentamethylol melamine and a semi-acetal is prepared as in Example 1. About 100 parts by volume of benzene and about 0.5 part by volume of dimethyl benzylamine are added to the semi-acetal, and about 252 parts by weight of chloro-N-hexyl isocyanate are introduced dropwise while cooling. After standing for about 14 hours at room temperature, all the isocyanate has reacted. A hydrophobic urethane is obtained, from which unreacted formaldehyde can easily be removed with ammonia. The substance is taken up in benzene, dried over sodium sulphate, and, after evaporating the benzene, there is obtained a formaldehyde-free reaction product having excellent storage stability and excellent solubility in organic solvents, such as, acetone, benzene, and toluene.

*Example 11*

About 32 parts by weight of methanol are added to a large excess of about 660 parts by weight of anhydrous acetaldehyde while cooling with ice. The mixture is kept at about 0° C., about 0.5 part by volume of dimethyl benzylamine is added, and a solution of about 153.5 parts by weight of p-chlorophenyl isocyanate in about 60 parts by volume of benzene is added dropwise over a period of about 4 hours. After standing for about 14 hours at about 15° C. to about 20° C., the substance is filtered off from small quantities of N,N′-di-p-chlorophenyl urea and excess acetaldehyde is removed by distillation at normal pressure and finally in vacuo. There is obtained a brownish colored reaction product which already decomposes at about 100° C. into acetaldehyde, carbon dioxide, methanol, and p-chloroaniline and its condensation products with acetaldehyde.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. A process for the preparation of urethane compounds free of urea groups which comprises reacting an organic isocyanate with a member selected from the group consisting of semi-acetals and semi-mercaptals under substantially anhydrous, non-acid conditions at a temperature below about 30° C.

2. A process for the preparation of mono-urethanes free from urea groups which comprises reacting an organic mono-isocyanate with a mono-semi-acetal under substantially anhydrous non-acid conditions at a temperature below about 30° C.

3. A process for the preparation of diurethane compounds free from urea groups which comprises reacting an organic monoisocyanate with a di-semi-acetal under substantially anhydrous non-acidic conditions at a temperature below about 30° C.

4. A process for the preparation of urethane compounds which comprises reacting an organic monoisocyanate with a semi-acetal having a molecular weight of from about 60 to about 700 and containing a grouping selected from the class consisting of

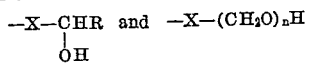

wherein X is a member selected from the class consisting of oxygen and sulphur, R is a member selected from the class consisting of hydrogen, aliphatic hydrocarbon radicals, cycloaliphatic hydrocarbon radicals, aromatic hydrocarbon radicals and heterocyclic radicals and $n$ represents an integer of at least one, under substantially anhydrous, nonacid conditions at a temperature below about 30° C.

5. A process for the preparation of a urethane which is capable of giving off formaldehyde at temperatures within the range of from about 120° C. to about 180° C. which comprises reacting an organic monoisocyanate with a semi-acetal having a molecular weight of from about 60 to about 700 and containing a grouping selected from the class consisting of

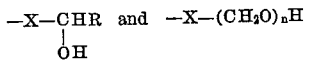

wherein X is a member selected from the class consisting of oxygen and sulphur, R is a member selected from the class consisting of hydrogen, aliphatic hydrocarbon radicals, cycloaliphatic hydrocarbon radicals, aromatic hydrocarbon radicals and heterocyclic radicals and $n$ represents an integer of at least one, under substantially anhydrous, nonacid conditions at a temperature below about 30° C.

6. A compound having the formula $$CH_3OCH_2OCONHC_6H_4Cl$$

7. A compound having the formula $$C_3H_7OCH_2OCONHC_6H_4Cl$$

8. A compound having the formula

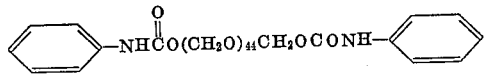

9. A compound having the formula

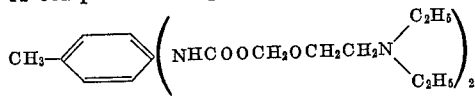

10. A compound having the formula

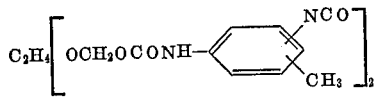

11. A compound having the formula

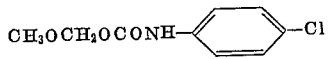

12. A compound having the formula

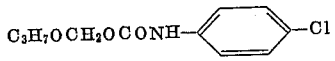

13. A compound having the formula

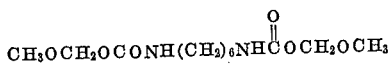

References Cited in the file of this patent

UNITED STATES PATENTS

| | | |
|---|---|---|
| 2,573,420 | Engel et al. | Oct. 30, 1951 |
| 2,855,421 | Bunge | Oct. 7, 1958 |

FOREIGN PATENTS

| | | |
|---|---|---|
| 918,983 | Germany | Oct. 11, 1954 |